US011999415B2

(12) United States Patent
Knook et al.

(10) Patent No.: US 11,999,415 B2
(45) Date of Patent: Jun. 4, 2024

(54) JOINT MODULE FOR AN ARTICULATED VEHICLE, ARTICULATED VEHICLE, AND METHOD FOR MANUFACTURING SUCH A JOINT MODULE

(71) Applicant: Jost-Werke Deutschland GMBH, Neu-Isenburg (DE)

(72) Inventors: Ruud Knook, Eindhoven (NL); Jos Robertus Leonardus Dobbelaar, Landhorst (NL)

(73) Assignee: Jost-Werke Deutschland GMBH, Neu-Isenburg (DE)

( * ) Notice: Subject to any disclaimer, the term of this patent is extended or adjusted under 35 U.S.C. 154(b) by 822 days.

(21) Appl. No.: 17/053,304

(22) PCT Filed: May 8, 2018

(86) PCT No.: PCT/NL2018/050300
§ 371 (c)(1),
(2) Date: Nov. 5, 2020

(87) PCT Pub. No.: WO2019/216759
PCT Pub. Date: Nov. 14, 2019

(65) Prior Publication Data
US 2021/0147011 A1 May 20, 2021

(51) Int. Cl.
*B62D 47/02* (2006.01)
*B60D 5/00* (2006.01)
*B61D 17/22* (2006.01)

(52) U.S. Cl.
CPC ........... *B62D 47/025* (2013.01); *B60D 5/003* (2013.01); *B60L 2200/18* (2013.01); *B61D 17/22* (2013.01)

(58) Field of Classification Search
CPC ... B62D 47/025; B60D 5/003; B60L 2200/18; B61D 17/22
See application file for complete search history.

(56) References Cited

U.S. PATENT DOCUMENTS 4,867,071 A * 9/1989 Weber .................. B61D 3/10
213/7
5,244,072 A 9/1993 Etherington et al.
(Continued)

FOREIGN PATENT DOCUMENTS

CN 102180073 A 9/2011
CN 103171387 A 6/2013
(Continued)

OTHER PUBLICATIONS

International Search Report for corresponding PCT/NL2018/050300 dated Feb. 1, 2019, 5 pgs.
(Continued)

*Primary Examiner* — Tony H Winner
(74) *Attorney, Agent, or Firm* — Rankin, Hill & Clark LLP

(57) ABSTRACT

A joint module for an articulated vehicle, for pivotally interconnecting a first vehicle part and a second vehicle part of the articulated vehicle, the joint module including articulation joint having:
a first segment, connectable to the first vehicle part,
a second segment, connectable to the second vehicle part,
a slewing bearing pivotally coupling the first segment to the second segment, the slewing bearing having an inner ring and an outer ring pivotable with respect to each other about a pivot axis, the pivot axis defining an axial direction of the articulation joint,
the first segment having two first connecting plates spaced apart at a first distance and perpendicular to the axial direction, the outer ring being fixated to the connecting plates therebetween, each of the two first connecting plates having an arc-shaped recess wherein a central axis of the arc-shape of the recess is concentric with the pivot axis, and (Continued)

the second segment having two second connecting plates spaced apart at a second distance and perpendicular to the axial direction, the second distance being such that the two first connecting plates, at least with a portion thereof between which the outer ring is fixated, extend between the two second connecting plates, and the inner ring being fixated to the second connecting plates therebetween and at the location of the recesses in the first segment and method of manufacturing the same.

21 Claims, 2 Drawing Sheets

(56) References Cited

U.S. PATENT DOCUMENTS

| | | | | |
|---|---|---|---|---|
| 5,253,727 | A | * | 10/1993 | Etherington ....... B62D 53/0871 280/426 |
| 5,332,247 | A | * | 7/1994 | Etherington ......... B62D 47/025 280/400 |
| 5,456,185 | A | * | 10/1995 | Rother ................... B61D 17/20 105/3 |
| 6,170,682 | B1 | * | 1/2001 | Sugimoto ............ B62D 47/025 280/441.1 |
| 9,150,062 | B2 | * | 10/2015 | Hao ........................ B60D 1/01 |
| 9,738,313 | B2 | * | 8/2017 | Yang ....................... B62D 13/00 |
| 2010/0013190 | A1 | * | 1/2010 | Koch ................. B62D 53/0871 280/492 |
| 2013/0062860 | A1 | | 3/2013 | Hao |
| 2016/0257176 | A1 | * | 9/2016 | Tabellini .................. B60D 1/30 |

FOREIGN PATENT DOCUMENTS

| | | |
|---|---|---|
| CN | 107697157 A | 2/2018 |
| WO | 2011143917 A1 | 11/2011 |
| WO | 2016015268 A1 | 2/2016 |
| WO | 2016015272 A1 | 2/2016 |

OTHER PUBLICATIONS

Espacenet Bibliographic data:CN 103171387 (A), Published Jun. 26, 2013, 1 pg.
Espacenet Bibliographic data:WO 2016015272 (A1), Published Feb. 4, 2016, 2 pgs.
Espacenet Bibliographic data:CN 107697157 (A), Published Feb. 16, 2018, 1 pg.
Chinese Office Action for corresponding 201880093197.4 dated Feb. 16, 2023, 12 pgs.
Espacenet Bibliographic data:CN 102180073 (A), Published Sep. 14, 2011, 1 pg.
Espacenet Bibliographic data:WO2016015268(A1), Published Feb. 4, 2016, 1 pg.

* cited by examiner

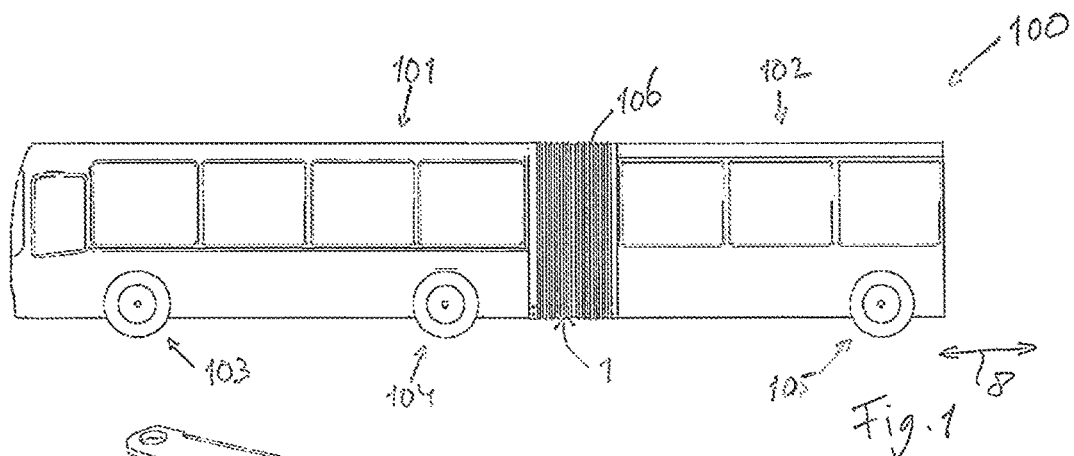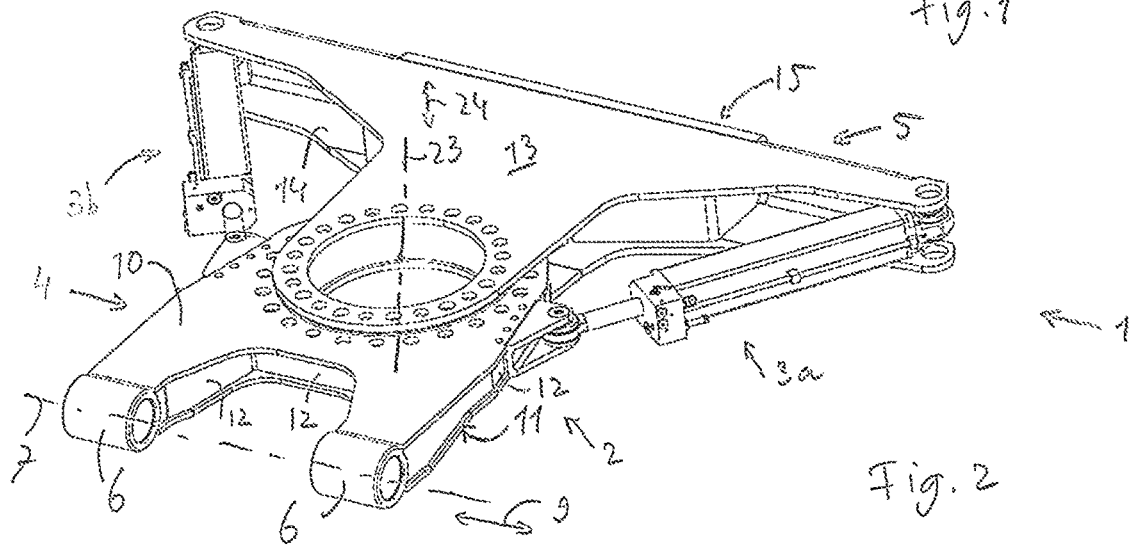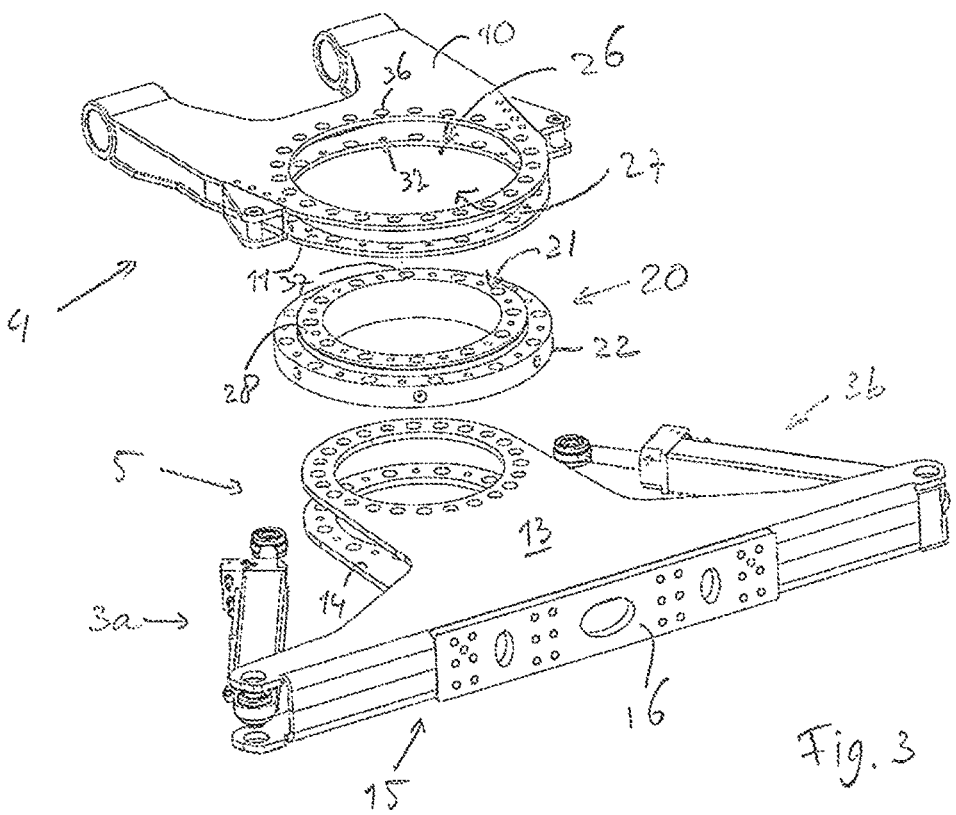

JOINT MODULE FOR AN ARTICULATED VEHICLE, ARTICULATED VEHICLE, AND METHOD FOR MANUFACTURING SUCH A JOINT MODULE

This Application is a national phase entry based on PCT Application PCT/NL2018/050300 (WO 2019/216759 A1) filed on May 8, 2018, which is incorporated by reference herein.

TECHNICAL FIELD

The present invention relates to a joint module for an articulated vehicle, the vehicle in particular being a passenger vehicle such as a passenger bus or being a coupled trailer for freight transport.

The present invention also relates to an articulated vehicle comprising such a joint module, and to a method of manufacturing such a joint module.

BACKGROUND

An embodiment of an articulated passenger bus has a front vehicle part, having front and rear wheels, that means a front axle and a rear axle, and has a rear vehicle part often having a single axle, or having two axles. The front and rear part are connected in an articulated manner using an articulation joint underneath the floor of the bus. The front vehicle part may carry at least a part of the weight of the rear part, via the articulation joint. In any case forces are transferred between the front and rear vehicle parts, via the articulation joint in use. In another embodiment the bus may have more than one of such rear parts, a first rear part forming an intermediate part and connected to the front part, and a second rear part connected to the rear side of the first rear part, also in an articulated manner. Such an intermediate part may in an alternative embodiment even be free of any wheels.

A typical requirement of a joint module comprising an articulation joint is thus that it should be able to function not only to let the vehicle parts pivot with respect to each other about a vertical pivot axis, but to function as a fixed drawbar of the rear part as well, so as to let a part of the weight of the rear part be supported by a front part of the vehicle. So as to reduce loads on the joint module, the joint module may be connected to the front part of the vehicle by a connection pivotable, typically about a few degrees, about a horizontal transverse pivot axis. The joint module is in that case fixated, i.e. in the absence of possibility to mutually move or pivot, to the rear part. Despite the presence of the pivotable connection the joint module needs to withstand very high loads, including as a result of torsional loads due to different rolling movements of a front and rear vehicle part, but also due to different pitching movements.

SUMMARY

It is an object of the present invention to provide an improved joint module for an articulated vehicle such as an articulated bus.

It is a further object of the present invention to provide a joint module for an articulated vehicle which can be subjected to relatively high loads, or, in other words, has a high load to weight ratio.

In an aspect, the present invention relates to a joint module for an articulated vehicle, for pivotally interconnecting a first vehicle part and a second vehicle part of the articulated vehicle. The joint module comprises an articulation joint comprising a first segment, connectable to the first vehicle part,
a second segment, connectable to the second vehicle part, and
a slewing bearing pivotally coupling the first segment to the second segment, the slewing bearing having an inner ring and an outer ring pivotable with respect to each other about a pivot axis, the pivot axis defining an axial direction of the articulation joint. The first segment has two first connecting plates spaced apart at a first distance and perpendicular to the axial direction, the outer ring being fixated to the connecting plates therebetween, each of the two first connecting plates having an arc-shaped recess wherein a central axis of the arc-shape of the recess is concentric with the pivot axis, and the second segment having two second connecting plates spaced apart at a second distance and perpendicular to the axial direction, the second distance being such that the two first connecting plates, at least with a portion thereof between which the outer ring is fixated, extend between the two second connecting plates, and the inner ring being fixated to the second connecting plates therebetween and at the location of the recesses in the first segment.

Preferably, the two first connecting plates extend mutually parallel, at least at the location of the slewing bearing, that is, at the location of the recesses. Similarly, preferably, the two second connecting plates extend mutually parallel, at least at the location of the slewing bearing. Preferably, the outer ring and the first connecting plates are configured such that the outer ring fits between both plates and is thus in contact with confronting surfaces of the both first connecting plates. The same preferably holds for the inner ring fitting between the both second connecting plates.

An effect of the construction of the joint module according to the present invention is that by providing the first and second segment as spaced apart plates, said first and second segment have a high resistance to bending and can thus be heavily loaded, combined with a relatively low weight, in particular compared to a case wherein a slewing bearing would be mounted between a single, but very thick, first plate fixated to the inner ring and a single, but very thick, second plate fixated to the outer ring, on the other side of the slewing bearing. Also, the provision of the first and second segments as spaced apart plates makes it possible to produce same efficiently at relatively low cost by using rolled steel plates, for example, instead of manufacturing the mentioned single, but thick plates by casting.

Thus, according to the present invention a joint module for an articulated vehicle is provided which can be subjected to relatively high loads, or, in other words, has a high load to weight ratio.

Preferably, the arc-shaped recesses are part of respective through holes through the first connecting plates. This way, each of the two first connecting plates thus has a through hole, the two holes being concentric with the pivot axis, and the inner ring is fixated to the second connecting plates therebetween and through the respective holes in the first segment, and consequently at the location of the holes in the first segment.

Corresponding embodiments of the joint module as discussed above are also applicable for the vehicle and method according to the present invention as described underneath, with the same or at least analogue effects.

In an embodiment an outer diameter of the inner ring matches the diameter of the arc-shaped recesses or, in case the recesses are part of through holes, of the through holes. Preferably, the inner ring protrudes in the respective recesses, or, in case the recesses are part of through holes, in the through holes in the first connecting plates. This provides an easy and effective fixation of the inner ring to the second connecting plates which are spaced apart at a larger distance than the first connecting plates. This effect is in particular at issue in case that, in an embodiment, the inner ring protrudes through the respective holes in the first connecting plates to such an extent that opposing fixation surfaces of the inner ring protrude outwards from opposing outer sides of the first connecting plates. This provides a clearance between the first and second connecting plates.

For the purpose of an easy, robust fixation, preferably, the first segment has been fixated to the outer ring via a bolted connection, and/or the second segment has been fixated to the inner ring via a bolted connection. Preferably, both the inner ring and outer ring have been fixated to the associated segment via a bolted connection.

In an embodiment, for the purpose of the bolted connection, the inner ring and/or the outer ring has a plurality of through fixation holes parallel to the axial direction, in line with fixation holes through the associated first or second connecting plates, each time a bolt being passed through a fixation hole in one of the connecting plates, through the inner ring or outer ring, and fixated to the respective inner ring or outer ring by means of a nut being put onto the bolt via the fixation hole in the other of the connecting plates.

In an embodiment, the joint module preferably comprises a pivot element via which at least one of the first segment and the second segment is connectable to the respective vehicle part. Preferably the first segment is connectable to the first vehicle part via the pivot element, while the second segment is fixated to the second vehicle part.

In an embodiment which provides a very easy and efficient manufacturing at low cost, the first connecting plates and/or, preferably and, the second connecting plates are of rolled steel, preferably wherein a plate thickness of the first and/or second connecting plates, at least with a portion thereof between which the respective outer or inner ring is fixated, is in the range of 10 to 18 mm.

In an embodiment the two second connecting plates are manufactured as a single integral part. Preferably, the single integral part has been manufactured from two steel plates welded together at the distance, preferably wherein each of the plates has an edge folded about an angle of 90 degrees thereby realizing a Li-shaped segment, the two second connecting plates forming legs of the U-shape and a base of the U-shape, formed by the two folded edges facing one another, being configured to be connected, preferably fixated, to the second vehicle part.

In an alternative embodiment, the two second connecting plates are manufactured as a single integral part manufactured from a single steel plate which has been folded twice about an angle of 90 degrees thereby realizing a Li-shaped segment, the two second connecting plates forming legs of the U-shape and a base of the U-shape being configured to be connected, preferably fixated, to the second vehicle part.

In particular for use on articulated vehicles of the so called "pusher" type, that is, the rear vehicle part has driven wheels, thereby pushing the front vehicle part, it is advantageous when the joint module further comprises a damping device operative between the first segment and the second segment, configured for damping a pivoting movement of the first segment with respect to the second segment about the pivot axis.

This increases the vehicle stability in use.

To this end, preferably the damping device comprises at least one piston-cylinder damper connected with a first end to the first segment and with a second, opposite end to a transverse extension portion of the second segment at a further distance seen in transverse direction from the pivot axis than the first end. Preferably, the damping device comprises two piston-cylinder dampers each connected with a first end to the first segment and with a second, opposite end to a respective of two opposing transverse extension portions of the second segment at a further distance seen in transverse direction from the pivot axis than the first end, and such that in plan view the two piston-cylinder dampers enclose between them an angle in the range of 40 to 100 degrees, preferably in the range of 55 to 85 degrees, further preferably between 65 and 75 degrees.

In combination with the damping device, or instead thereof, the joint module may further comprise a steering device operative between the first segment and the second segment, configured for providing a steering movement of the first segment with respect to the second segment about the pivot axis, preferably wherein the steering device comprises at least one piston-cylinder device connected with a first end to the first segment and with a second, opposite end to a transverse extension portion of the second segment at a further distance seen in transverse direction from the pivot axis than the first end. Such a steering device is in particular advantageous on articulated vehicles of the so called "puller" type, that is, the front vehicle part has driven wheels, thereby pulling the rear vehicle part.

The invention further relates to an articulated vehicle, comprising a joint module according to the invention as described above, wherein the first segment has been connected to a first, preferably front vehicle part of the articulated vehicle and the second segment has been connected to a second, preferably rear vehicle part of the articulated vehicle.

Preferably, in use the first segment has been connected to the first vehicle part pivotable about a further pivot axis perpendicular to the pivot axis of the joint module, the further pivot axis extending in a transverse direction of the vehicle.

In another aspect, the invention relates to a method of manufacturing a joint module according to the invention as described above, the method comprising:
providing the first segment,
providing the second segment,
providing a slewing bearing, and
    fixating the outer ring to the two first connecting plates therebetween,
    fixating the inner ring to the two second connecting plates therebetween, such that the two first connecting plates, at least with a portion thereof between which the outer ring is fixated, extend between the two second connecting plates.

In an embodiment of the method, for the purpose of providing the first segment, the method comprises
    providing and permanently fixating, such as including welding, the two first connecting plates spaced apart at a first distance with respect to each other, thereby obtaining a single piece having the two first connecting plates,
the method further comprising, for the purpose of providing the second segment, providing and permanently fixating, such as including welding, the two second connecting plates spaced apart at a first distance with respect to each other, thereby obtaining a single piece having the two second connecting plates.

In an alternative embodiment, the method comprises, for the purpose of providing the second segment,
providing a steel plate, and
folding the steel plate twice about an angle of 90 degrees thereby realizing a U-shaped segment, the two second connecting plates forming legs of the U-shape and a base of the U-shape being configured to be connected, preferably fixated, to the second vehicle part.

In an embodiment, the method comprises, for the purpose of providing a slewing bearing,
fixating the outer ring in the absence of the inner ring to the first connecting plates therebetween, by sliding the outer ring between the two first connecting plates and fixating it to same,
mounting the inner ring in place via at least one of the two recesses in the first connecting plates, and
fixating the inner ring to the second connecting plates therebetween.

Effects of the joint module as described above are applicable in an analogous manner to the vehicle and method according to the present invention.

These and other objects, aspects, features and advantages of the invention will become apparent to those skilled in the art upon a reading of the Detailed Description of the invention set forth below taken together with the drawings which will be described in the next section.

BRIEF DESCRIPTION OF DRAWINGS

The present invention is described hereinafter with reference to the accompanying schematic drawings in which embodiments of the present invention are shown and in which like reference numbers indicate the same or similar elements.

FIG. 1 shows an embodiment of an articulated bus according to the invention,
FIG. 2 shows in three-dimensional view an embodiment of a joint module according to the invention, for use in the articulated bus of FIG. 1,
FIG. 3 shows the joint module of FIG. 2 in exploded view.

DESCRIPTION OF PREFERRED EMBODIMENTS

Figure 4:
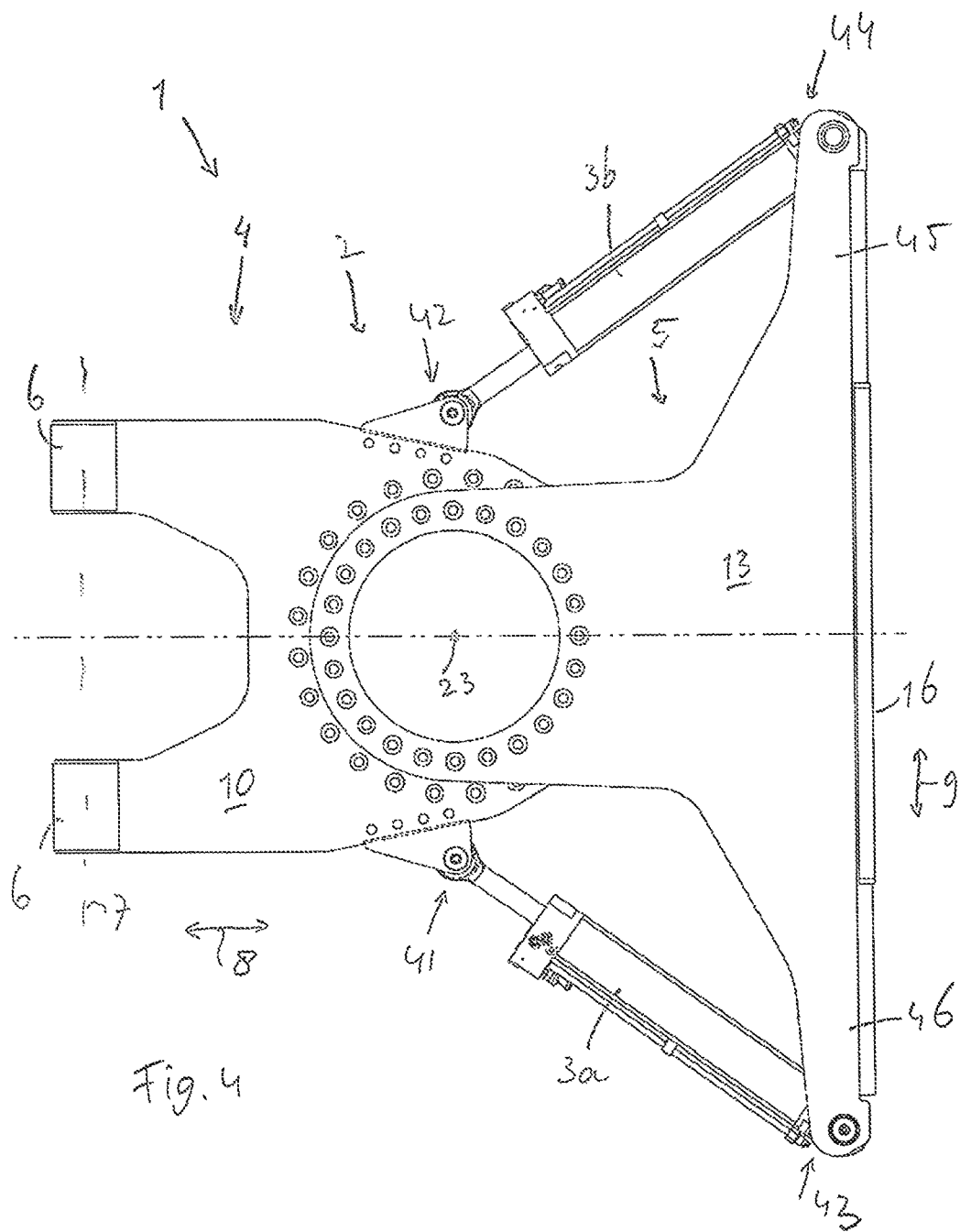
FIG. 4 shows the joint module of FIG. 2 in plan view.

Referring now to the drawings wherein the showings are for the purpose of illustrating preferred and alternative embodiments of the invention only and not for the purpose of limiting the same, FIG. 1 shows an articulated passenger bus 100 which has a front vehicle part 101, having front wheels 103 and rear wheels 104, that means a front axle and a rear axle, and has a rear vehicle part 102 only having a single axle, with wheels 105. In an alternative embodiment the front vehicle part 101 may be of an 8×2 configuration, that is, it has two front axles and two rear axles. In an embodiment the rear vehicle part 102 may have a tandem axle group. The front and rear part 101, 102 are connected in an articulated manner by means of a joint module 1 having an articulation joint underneath a floor of the bus 100. In FIG. 1 the joint module is hidden from sight by a bellows 106, the joint module being indicated by the dashed lines. The front vehicle part 101 carries a part of the weight of the rear part 102, via the joint module 1.

FIGS. 2, 3, 4 and 5 shows the joint module 1, or at least its primary components. The joint module has an articulation joint 2 and a damping device 3a, 3b. The joint 2 comprises a first segment 4, which is connectable to the first vehicle part 101 by means of a pivotable connection, having bushings 6 in which rubber parts may be slid which are connected to the first vehicle part 101. This way, the first segment 4 is pivotable (over a few degrees depending on the flexibility of the rubber parts) about a pivot axis 7 extending horizontally and transverse (in transverse direction 9) to the vehicle longitudinal direction 8 in a mounted condition of the joint module 1 in the vehicle. The first segment 4 has two first connecting plates 10, 11 of rolled steel, welded to the bushings 6 and welded together at a distance, having bridge parts 12 in between both to increase the strength of the first segment 4.

The articulation joint 2 also has a second segment 5 which has two second connecting plates 13, 14 manufactured as a single integral part of rolled steel plates which each have an edge folded about an angle of 90 degrees, thereby realizing a U-shaped segment, the two second connecting plates 13, 14 forming legs of the U-shape and, the both folded edges facing each other, a base 15 of the U-shape which is partly cut away for providing a flat fixation portion 16 welded to the base 15 for immovably, i.e. non-moving and non-pivoting, fixating the second portion 5 to the second vehicle part 02. A plate thickness of the first and second connecting plates 10, 11; 13, 14 may preferably be in the range of 10 to 25 mm, further preferably in the range of 10 to 18 mm. The plates may be of a mutually equal or different thickness. For example, the connecting plates associated to the rear vehicle part may be of larger thickness. Also, the plate thickness may be constant or may vary.

The articulation joint 2 also has a slewing bearing 20 which is principally of known construction, that is, it has an inner ring, an outer ring, mutually pivotable about a central pivot axis 23 extending vertical in mounted condition of the joint module 1 in the vehicle 100, that is, perpendicular to the, horizontal, central axes of the vehicle axles and perpendicular to the vehicle longitudinal direction 8. To this end the slewing bearing has a raceway operative between the inner ring and the outer ring, and has rotating elements such as balls or barrels provided in the raceway.

The slewing bearing 20 pivotally, about the pivot axis 23, couples the first segment 4 to the second segment 5. The pivot axis 23 defines an axial direction 24 of the articulation joint 2. To this end, the outer ring 22 has been fixated, by a bolted connection, to the connecting plates 10, 11 of the first segment 4 therebetween, the first connecting plates 10, 11 being spaced apart parallel at a distance, at least at the location of the slewing bearing 20, and being perpendicular to the axial direction 24. Each of the two first connecting plates 10, 11 has a through hole 26, 27, the two holes 26, 27 being concentric with the pivot axis 23. The holes are such that the inner ring 21 is exposed through the holes 26, 27, on both sides of the inner ring 21 seen in the axial direction 24. The, circular, holes 26, 27 are of a diameter which is about equal to, more specifically a little larger such as by a diametric difference of at most 40 mm, preferably in the range of 1 to 25 mm, to an outer diameter of the inner ring 21 which is about equal to an inner diameter of the outer ring 22. See also the cross-section of FIG. 5. In an alternative embodiment, one or both of the first connecting plates may, instead of said through holes, have an arc-shaped recess wherein a central axis of the arc-shape of the recess is concentric with the pivot axis. The arc-shape for example extends over 180 degrees thereby forming a half of the hole, as it were. The arc-shape may also extend over less than, or more than, 180 degrees, like over 120 or 270 degrees, for example. When the arc-shape would extend over the full 360 degrees, it in fact forms a through hole.

Figure 5:
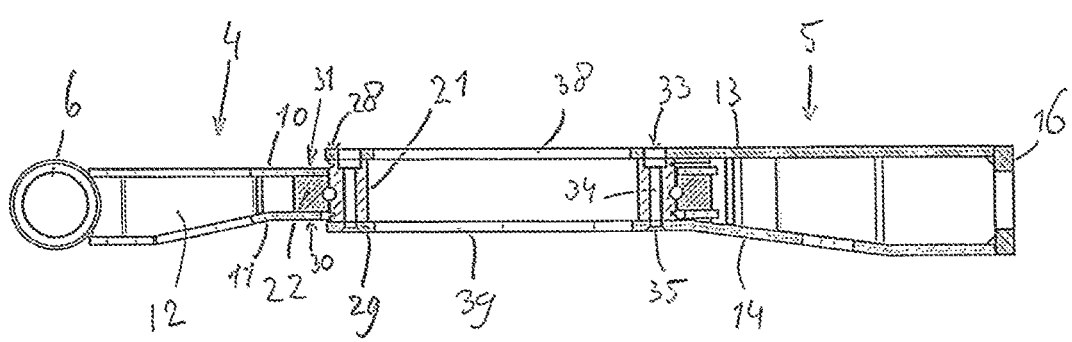
FIG. 5 shows section v-v of FIG. 4.

Each of the two second connecting plates 13, 14 also has a through hole 38, 39, the two holes 38, 39 being concentric with the pivot axis 23. The holes 38, 39 are of a diameter a little less than an inner diameter of the inner ring 21 of the slewing bearing 20, as shown in FIG. 5. The purpose of the holes 38, 39 is weight reduction and providing a more easy access, and passage, of additional components like lubrication lines, for example.

The inner ring 21 of the slewing bearing 20 protrudes through the holes 26 in the first connecting plates 10, 11 to such an extent that opposing fixation surfaces 28, 29 of the inner ring 21 protrude outwards from opposing outer sides, that is, outer surfaces 30, 31, of the first connecting plates 10, 11.

The two second connecting plates 13, 14 are spaced apart at a second distance being such that the two first connecting plates 10, 11, at least with a portion thereof between which the outer ring 22 is fixated, extend between the two second connecting plates 13, 14 as in particular shown in FIGS. 2 and 5. Said second distance thus being (about) equal to the thickness of the inner ring 21, that is, its dimension in axial direction 24. The inner ring 21 has been fixated to the second connecting plates 13, 14 therebetween and, as mentioned, through the respective holes 26, 27 in the first segment 4 as FIG. 5 shows. That means, respective portions of the inner ring and/or the second connecting plates at the connection between both, are located in the holes 26, 27, the present example being respective portions of the inner ring. Because the inner ring 21 protrude outwards from opposing outer sides, that is, outer surfaces 30, 31, of the first connecting plates 10, 11, a gap between the first segment 4 and second segment 5 is thereby created, which avoids contact between both in use of the joint module 1.

The first segment 4 has been fixated to the outer ring 22 via a bolted connection. For the purpose of the bolted connection, the outer ring 22 has a plurality of through fixation holes parallel to the axial direction, in line with fixation holes through the associated first connecting plates, each time a bolt (not shown) being passed through a countersunk, or alternatively counterbored fixation hole 32 in one of the first connecting plates 10, 11, through the fixation hole in the outer ring 22 so that a free end of the bolt protrudes through the hole in the outer ring, so that a nut can be put on the bolt via the fixation hole 36 in the other of the first connecting plates 11, 10, the nut being received in a counterbored portion of the fixation hole through the outer ring 22. As FIG. 3 shows in particular, for the plurality of through holes in the outer ring 22, a direction of mounting of the bolts each time alternates. That is, while a first bolt fixates the outer ring 22 to the plate 10, its two adjacent bolts fixate the outer ring 22 to the plate 11, etcetera. The same construction holds for the fixation of the inner ring 21 to the second connection plates 13, 14. As FIG. 5 shows, each time a bolt (not shown) is passed through a countersunk fixation hole 35 in one of the second connecting plates 14, 13, through hole 34 in the inner ring 21 where a nut can be screwed on the free end of the hole through the fixation hole 33 in the other of the second connecting plates 13, 14, and that just like the bolts through the outer ring in an alternating manner of direction of mounting. The bolts may be splined bolts or fitted bolts, so as to provide an effective, non-sliding fixation of the respective ring 21, 22 to the associated connecting plates 10, 11 or 13, 14.

The joint module 1 also has a damping device 3a, 3b operative between the first segment 4 and the second segment 5 of the articulation joint 2. Presence of a damping device is optional within the scope of the present invention. The damping device is configured for damping a pivoting movement of the first segment 4 with respect to the second segment 5 about the pivot axis 23. To this end, the damping device comprises two piston-cylinder dampers 3a, 3b each connected with a first end 41; 42 to the first segment 4, pivotally about an axis parallel to the pivot axis 23, and with a second, opposite end 43; 44 to a transverse extension portion 46; 45 of the second segment 5, pivotally about an axis parallel to the pivot axis 23, at a further distance seen in transverse direction from the pivot axis 23 than the first end, as FIG. 4 shows. In the plan view of FIG. 4 is shown that the two piston-cylinder dampers 3a, 3b enclose between them an angle of about 70 degrees.

The joint module 1 may be manufactured as follows:
providing the first segment 4 by providing and permanently fixating, such as including welding, the two first connecting plates 10, 11 parallel at a first distance with respect to each other, thereby obtaining a single piece having the two first connecting plates 10, 11,
providing the second segment 5, by providing steel plates, and folding edges of the steel plates about an angle of 90 degrees, welding the plates together at a distance with the folded edges facing each other, thereby realizing a U-shaped segment, the two second connecting plates 13, 14 forming legs of the U-shape and a base 15 of the U-shape, formed by the two folded edges, being configured to be connected, preferably fixated, to the second vehicle part 102,
providing the slewing bearing, and
fixating the outer ring 22 in the absence of the inner ring 21 to the first connecting plates 10, 11 therebetween, by sliding the outer ring 22 between the two first connecting plates 10, 11 and fixating it to same in the manner as described above,
mounting the inner ring 21 in place via at least one of the two through holes 26, 27 in the first connecting plates 10, 11, and
fixating the inner ring 21 to the second connecting plates 13, 14 therebetween in a manner as described above.

After that, the rollers/balls of the slewing bearing may be fed to the raceway between the outer and inner ring, via a feed opening in one of the inner and the outer ring. Also, the damping device may optionally be mounted, operative between the first segment and the second segment in the manner as described above.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The foregoing description provides embodiments of the invention by way of example 30 only. The scope of the present invention is defined by the appended claims. One or more of the objects of the invention are achieved by the appended claims.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A joint module for an articulated vehicle, for pivotally interconnecting a first vehicle part and a second vehicle part of the articulated vehicle, the joint module comprising an articulation joint comprising:
   a first segment, connectable to an associated first vehicle part,
   a second segment, connectable to an associated second vehicle part,
   a slewing bearing pivotally coupling the first segment to the second segment, the slewing bearing having an inner ring and an outer ring pivotable with respect to each other about a pivot axis, the pivot axis defining an axial direction of the articulation joint, the first segment having two first connecting plates spaced apart at a first distance and perpendicular to the axial direction, the outer ring being fixated to the connecting plates therebetween, each of the two first connecting plates having an arc-shaped recess wherein a central axis of the arc-shape of the recess is concentric with the pivot axis, and the second segment having two second connecting plates spaced apart at a second distance and perpendicular to the axial direction, the second distance being such that the two first connecting plates, at least with a portion thereof between which the outer ring is fixated, extend between the two second connecting plates, and the inner ring being fixated to the second connecting plates therebetween and at a location of the recesses in the first segment.

2. The joint module according to claim 1, wherein the arc-shaped recesses are part of respective through holes through the first connecting plates.

3. The joint module according to claim 1, wherein the inner ring protrudes in the respective recesses in the first connecting plates.

4. The joint module according to claim 3, wherein the inner ring protrudes through the respective recesses in the first connecting plates to such an extent that opposing fixation surfaces of the inner ring protrude outwards from opposing outer sides of the first connecting plates.

5. The joint module according to claim 1, wherein the first segment has been fixated to the outer ring via a bolted connection, and/or the second segment has been fixated to the inner ring via a bolted connection.

6. The joint module according to claim 5, wherein, for a purpose of the bolted connection, the inner ring and/or the outer ring has a plurality of through fixation holes parallel to the axial direction, in line with fixation holes through the associated first or second connecting plates, each time a bolt being passed through a fixation hole in one of the connecting plates, through the inner ring or outer ring, and fixated to the respective inner ring or outer ring by means of a nut being put onto the bolt via the fixation hole in another of the connecting plates.

7. The joint module according to claim 1, further comprising a pivot element via which at least one of the first segment and the second segment is connectable to the respective associated vehicle part.

8. The joint module according to claim 1, wherein the two second connecting plates are a single integral part of two steel plates welded together at the second distance.

9. The joint module according to claim 1, further comprising a damping device operative between the first segment and the second segment, configured for damping a pivoting movement of the first segment with respect to the second segment about the pivot axis.

10. The joint module according to claim 9, wherein the damping device comprises at least one piston-cylinder damper connected with a first end to the first segment and with a second, opposite end to a transverse extension portion of the second segment at a further distance seen in a transverse direction from the pivot axis than the first end.

11. The joint module according to claim 10, wherein the at least one piston-cylinder damper comprises two piston-cylinder dampers each connected with the first end to the first segment and with the second, opposite end to a respective of two opposing transverse extension portions of the second segment at the further distance seen in the transverse direction from the pivot axis than first end, and such that in a plan view the two piston-cylinder dampers enclose between them an angle in a range of 40 to 100 degrees.

12. An articulated vehicle, comprising a joint module according to claim 1, wherein the first segment being connected to a first vehicle part of the articulated vehicle and the second segment being connected to a second vehicle part of the articulated vehicle.

13. The articulated vehicle according to claim 12, wherein the first segment being connected to the first vehicle part pivotable about a further pivot axis perpendicular to the pivot axis of the joint module, the further pivot axis extending in a transverse direction of the vehicle.

14. A method of manufacturing a joint module according to claim 1, comprising:
   providing the first segment,
   providing the second segment,
   providing a slewing bearing, and
   fixating the outer ring to the two first connecting plates therebetween,
   fixating the inner ring to the two second connecting plates therebetween,
such that the two first connecting plates, at least with a portion thereof between which the outer ring is fixated, extend between the two second connecting plates.

15. A method of manufacturing a joint module according to claim 14, comprising, for a purpose of providing the first segment,
   providing and permanently fixating the two first connecting plates spaced apart at a first distance with respect to each other, thereby obtaining a single piece having the two first connecting plates, the method further comprising, for the purpose of providing the second segment,
   providing and permanently fixating the two second connecting plates spaced apart at a first distance with respect to each other, thereby obtaining a single piece having the two second connecting plates.

16. A method according to claim 15, comprising, for a purpose of providing a slewing bearing,
   fixating the outer ring in an absence of the inner ring to the first connecting plates therebetween, by sliding the outer ring between the two first connecting plates and fixating it to same, mounting the inner ring in place via at least one of the two recesses in the first connecting plates, and fixating the inner ring to the second connecting plates therebetween.

17. The joint module according to claim 1, further comprising a steering device operative between the first segment and the second segment, configured for providing a steering movement of the first segment with respect to the second segment about the pivot axis.

18. The joint module according to claim 17, wherein the steering device comprises at least one piston-cylinder device connected with a first end to the first segment and with a second, opposite end to a transverse extension portion of the second segment at a further distance seen in a transverse direction from the pivot axis than the first end.

19. The joint module according to claim 1, wherein the first connecting plates and/or the second connecting plates are of rolled steel.

20. The joint module according to claim 19, wherein a plate thickness of the first and/or second connecting plates, at least with a portion thereof between which the respective outer or inner ring is fixated, is in the range of 10 to 18 mm.

21. The joint module according to claim 19, wherein each of the plates has an edge folded about an angle of 90 degrees thereby realizing a U-shaped segment, the two second connecting plates forming legs of the U-shape and a base of the U-shape, formed by the two folded edges facing one another, being configured to be connected to the associated second vehicle part.

\* \* \* \* \*